US012725150B1

(12) United States Patent
Ryan et al.

(10) Patent No.: US 12,725,150 B1
(45) Date of Patent: Sep. 1, 2026

(54) SYSTEMS AND METHODS FOR CONTROLLING EXECUTION OF OPERATIONS ACROSS SERVICES DISTRIBUTED IN NETWORKED ENVIRONMENTS VIA NETWORK OPERATION PROTOCOLS

(71) Applicant: STRIPE, INC., South San Francisco, CA (US)

(72) Inventors: Brendan Ryan, San Francisco, CA (US); James Wenzel, South San Francisco, CA (US)

(73) Assignee: STRIPE, LLC, South San Francisco, CA (US)

( * ) Notice: Subject to any disclaimer, the term of this patent is extended or adjusted under 35 U.S.C. 154(b) by 0 days.

(21) Appl. No.: 19/415,464

(22) Filed: Dec. 10, 2025

(51) Int. Cl.
*G06Q 20/38* (2012.01)

(52) U.S. Cl.
CPC ....... *G06Q 20/3829* (2013.01); *G06Q 20/389* (2013.01)

(58) Field of Classification Search
None
See application file for complete search history.

(56) References Cited

U.S. PATENT DOCUMENTS 11,308,487 B1 * 4/2022 Foster .................. G06Q 20/065
11,720,887 B1 * 8/2023 Arvanaghi ......... G06Q 20/3676 705/64
2016/0078428 A1* 3/2016 Moser ................ G06Q 20/4012 705/41
2019/0340607 A1* 11/2019 Lynn .................. G06Q 20/4014
2020/0013048 A1* 1/2020 Love .................... G06Q 20/401
2020/0051068 A1* 2/2020 Love .................. G06Q 20/0655
2020/0160330 A1* 5/2020 Yan ....................... H04L 9/0861
2021/0019737 A1* 1/2021 Vladi ...................... G06Q 20/02
2022/0198559 A1* 6/2022 Dalton .................. H04L 63/101
2023/0196347 A1* 6/2023 Tate ................... G06Q 20/3825 705/75
2024/0394670 A1* 11/2024 Kim ..................... G06Q 20/381
2025/0139624 A1* 5/2025 Cowan ............... G06Q 20/4014
2025/0156828 A1* 5/2025 Sliwka .................. H04L 9/3247
2025/0278722 A1* 9/2025 Sota .................... G06Q 20/065
(Continued)

FOREIGN PATENT DOCUMENTS

WO WO-2020076234 A1 * 4/2020 ........... H04L 9/3239
WO WO-2025224248 A1 * 10/2025 .......... G06Q 20/405

*Primary Examiner* — Jahed Ali
(74) *Attorney, Agent, or Firm* — Foley & Lardner LLP

(57) ABSTRACT

Presented herein are systems and methods of controlling execution of operations via network operation protocols to delegate across services distributed in networked environments. A first service may receive, from a second service, a request to delegate including a digital address of a first digital key manager of a user to which tokens on a distributed ledger is assigned. The first service may construct, responsive to the request to delegate, a network operation protocol comprising: (i) a first component to control transfer of an assignment of tokens from the first digital key manager to a second digital key manager of the first service on behalf of a computing system, (ii) a second component to set constraints on execution of ledger operations on the distributed ledger for transferring the assignment, and (iii) a third component to execute the ledger operations to transfer the assignment.

20 Claims, 8 Drawing Sheets

(56) References Cited

U.S. PATENT DOCUMENTS

| | | | | |
|---|---|---|---|---|
| 2026/0030619 | A1* | 1/2026 | Vogt | G06Q 20/381 |
| 2026/0037936 | A1* | 2/2026 | Kim | G06Q 20/065 |
| 2026/0073377 | A1* | 3/2026 | Huang | G06Q 20/29 |

* cited by examiner

SYSTEMS AND METHODS FOR CONTROLLING EXECUTION OF OPERATIONS ACROSS SERVICES DISTRIBUTED IN NETWORKED ENVIRONMENTS VIA NETWORK OPERATION PROTOCOLS

TECHNICAL FIELD

The present application is generally related to controlling execution of operations via network operation protocols to delegate across services distributed in networked environments.

BACKGROUND

In a network environment, a multitude of network nodes may maintain its own instance of a digital distributed ledger including a set of data records. Each record may correspond to an operation in the environment, and may be cryptographically linked to a previous record corresponding to another operation. The data records on the digital ledger may be updated in accordance with a consensus algorithm. Under this algorithm, whenever an operation in the network environment is to be recorded on the distributed digital ledger, the network nodes may validate a new data record prior to its addition to the digital ledger. Once the data record is validated and added to the digital ledger, the data record may become immutable. The set of data records on a digital distributed ledger may be updated via a network operation protocol. The network operation protocol may be a self-executing program that are deployed on the digital distributed ledger and include logic to perform certain operations across the network nodes. When deployed on the distributed digital ledger, each network node may carry out the program on the network operation protocol upon a trigger as specified in the logic.

SUMMARY

Presented herein are systems and methods for controlling the execution of operations via network operation protocols in network environments. A digital distributed ledger may be used to store and maintain a set of data records to keep track of assignment of tokens defining values across different network nodes. Certain standards for distributed digital ledgers may support a delegation mechanism, under which a network node (e.g., a digital key manager of a user) to which tokens are assigned can authorize another network node (e.g., another service) to transfer tokens on its behalf. The delegation authority may be recorded on the set of data records and carried out via a network operation protocol. Once the delegation authority is recorded, the authorized network node may act on behalf of the assignor network node in transferring the assignment of tokens to other network nodes on the digital ledger, without seeking the original network node for approval for each transfer.

Though the delegation mechanism can permit the reassignment of tokens by authorized network nodes, the standards may be quite restrictive and limited. For example, the mechanism may allow only one delegated network node and a limit on the value corresponding to the tokens for the lifetime of the delegation. The constraint on the number of delegated network nodes can result in risk of breakdown in situations, where there are continuous, multiple network operations to transfer the assignment of tokens from one node to another node. Furthermore, if the network node reassigns the delegation to another network node, the subsequent network operations may be interrupted and prevented from being executed. The limit on the value may also not provide for controls on a per-operation basis and may lack granular checks, such as velocity on assignments of tokens and destination controls. In addition, the delegation scheme may conflate all permissions under one encryption key. This may significantly increase the risk of a compromised key, which can result in an ability to obtain unauthorized control of delegated network nodes.

To address these and other technical problems with delegation mechanisms, a controller service may construct and deploy a network operation protocol for the delegation of authority for a digital key manager of a user on the distributed digital ledger. The construction of the network operation protocol may be in conjunction with an issuance of an electronic card by a card issuance service for the user. Together with the issuance of the electronic card, the card issuance service may prompt a user device to send a request to delegate authority on behalf of its digital key manager to the controller service. With receipt of the request to delegate, the controller service may create the network operation protocol. The delegation on behalf of the digital key manager of the user may be on a per-computing system basis.

The network operation protocol can include three components to effectuate the delegation of the authority to transfer tokens on behalf of the digital key manager of the user. In the network operation protocol, an administrative component may specify which computing systems are permitted as destinations of tokens from the digital key manager of the user. A constraint component may specify a set of constraints, such as limit on the transferred value and a velocity of operations, on a per computing system basis. A transfer component may include logic and encryption keys to execute transfer of tokens from the digital key manager of the user to a digital key manager of the controller service for the operation. With the construction of the network operation protocol, the controller service may add and record the network operation protocol on the distributed digital ledger.

When the electronic card is used at a terminal associated with a computing system, the controller service may receive a request to execute operations from a computing system via the card issuance service. Upon receipt of the request, the controller service may identify the network operation protocol linked with the electronic card. Using the administrative component of the network operation protocol, the controller service may determine whether tokens of the digital key manager of the user are permitted to be transferred to the digital key manager of the computing system. Using the constraint component of the network operation protocol, the controller service may determine whether the request satisfies the set of constraints. When the tokens are determined to be not permitted to be transferred to the digital key manager of the computing system or the set of constraints are not satisfied, the controller service may reject the request to execute and send a message indicating failure to the computing system. On the other hand, when the tokens are determined to be permitted to be transferred and the set of constraints are satisfied, the controller service may use the transfer component to execute an operation on the distributed ledger to transfer the tokens from the digital key manager of the user to the digital key manager of the controller service. In addition, the controller service may execute a network operation to permit the transfer of the equivalent value from one data structure associated with the controller service to another data structure associated with the computing system in connection with the electronic card.

In this manner, the network operation protocol with the components as detailed herein can be introduced to act as a unified delegate on behalf of the digital key manager of the user linked with the electronic card. The inclusion of permitted destinations in the network operation protocol may eliminate the problem on the limited number of delegate network nodes. The definition of constraints in the network operation protocol may provide greater flexibility and granularity in controlling which operations to transfer tokens on behalf of the digital key manager of the user are permitted. By incorporating conditional transfer logic, the network operation protocol can carry out operations on the digital ledger upon passing the checks on permitted destinations and constraints. In addition, the use of the key by the network operation protocol may limit the transfer of tokens within the scope of the delegated authority.

The network operation protocol may improve network security with respect to the assignment of tokens on the digital distributed ledger. The controller service can also carry out operations on both the digital distributed ledger and the electronic card. The controller service along with the network operation protocol can thus reduce the consumption of computing resources (e.g., processor and memory) and network bandwidth, relative to techniques that would have entailed the user individually carrying out the operation using the electronic card and the other operation involving the digital key manager.

Aspects of the present disclosure may be directed to systems, methods, devices, and non-transitory computer readable media for controlling execution of operations via network operation protocols to delegate across services distributed in networked environments. A first service may receive, from a second service, a request to delegate comprising a digital address of a first digital key manager of a user to which at least one token of a plurality of tokens on a distributed ledger is assigned. The first digital key manager may be associated with an electronic card generated by the second service for the user. The first service may construct, responsive to the request to delegate, a network operation protocol comprising: (i) a first component configured to control transfer of an assignment of the at least one token from the first digital key manager to a second digital key manager of the first service on behalf of at least one of a plurality of computing systems, (ii) a second component configured to set, for each of the plurality of computing systems, a respective plurality of constraints on execution of ledger operations on the distributed ledger for transferring the assignment of the at least one token to the second digital key manager, and (iii) a third component configured to execute the ledger operations to transfer the assignment of the at least one token. The first service may add, on the distributed ledger, the network operation protocol for the at least one token assigned to the first digital key manager. The first service may receive, in response to activation of the electronic card using a terminal of a computing system of the plurality of computing systems, a request to execute comprising a value to be transferred from a first data structure of the user to a second data structure of the computing system. The first service may identify, from the distributed ledger, the network operation protocol of the at least one token associated with the user, responsive to receiving the request to execute. The first service may determine, using the first component, that the assignment of the at least one token is permitted to be transferred from the first digital key manager to the second digital key manager on behalf of the computing system. The first service may determine, using the second component, that a plurality of constraints for the computing system is satisfied based on the request to execute. The first service may execute, using the third component, a ledger operation to transfer the assignment of the at least one token from the first digital key manager to the second digital key manager, responsive to determining that the assignment is permitted and determining that the plurality of constraints is satisfied.

In one embodiment, the first service may, responsive to a second request to execute from a second computing system, determine, using the first component, that the assignment of the at least one token is not permitted to be transferred from the first digital key manager to the second digital key manager on behalf of the second computing system. The first service may determine, using the second component, that the plurality of constraints is not satisfied based on the second request to execute. The first service may, responsive to determining that the assignment is not permitted or determining that the plurality of constraints is not satisfied: refrain, using the third component, from executing a second ledger operation to transfer assignment of the at least one token from the first digital key manager to the second digital key manager; and transmit, to the second computing system, a message to indicate failure to validate against the network operation protocol.

In another embodiment, the first service may determine, responsive to receiving the request to execute, that a plurality of execution controls for the ledger operations and network operations is satisfied, the plurality of execution controls separate from the plurality of constraints of the network operation protocol. The first service may execute the ledger operation, responsive to determining that the plurality of execution controls is satisfied. In yet another embodiment, the first service may receive the request to execute comprising an identifier of the electronic card associated with the first digital key manager of the user. The first service may identify, using the identifier of the electronic card, the digital address of the first digital key manager. The first service may identify, using the digital address of the first digital key manager, the network operation protocol on the distributed ledger.

In yet another embodiment, the first service may receive, from the second service, a request to terminate delegation of the at least one token that is assigned to the first digital key manager to the second digital key manager. The first service may disable, responsive to receiving the request to terminate, the network operation protocol on the distributed ledger to revoke permission to transfer the at least one token from the first digital key manager to the second digital key manager. In yet another embodiment, the first service may construct the network operation protocol to include a plurality of identifiers corresponding to the plurality of computing systems for which the at least one token is permitted to be transferred from the first digital key manager to the second digital key manager. The first service may determine that the assignment of the at least one token is permitted to be transferred by: (i) identifying an identifier corresponding to the computing system from the request to execute and (ii) determining that the identifier corresponding to the computing system matches one of the plurality of identifiers. In yet another embodiment, the first service may identify, using the second component, the plurality of constraints for the computing system using an identifier corresponding to the computing system from the request to execute.

In yet another embodiment, the first service may execute the ledger operation to transfer the assignment of the at least one token from the first digital key manager of the user via a third digital key manager of the network operation protocol to the second digital key manager of the first service. In yet another embodiment, the plurality of constraints may include at least one of: (i) a maximum value for transfer, (ii) a limit on transfers over a time period, (iii) a remaining value of the first digital key manager, or (iv) a maximum rate of executions. In yet another embodiment, the first service may execute a network operation to transfer the value from the first data structure of the user to the second data structure of the computing system, responsive to determining that the assignment is permitted, determining that the plurality of constraints is satisfied, and executing the ledger operation. The first service may transmit, to the computing system, a message to indicate completion of the request to execute, responsive to executing the ledger operation and the network operation.

BRIEF DESCRIPTION OF THE DRAWINGS

The accompanying drawings constitute a part of this specification and illustrate embodiments of the subject matter disclosed herein.

DETAILED DESCRIPTION

Figure 1:
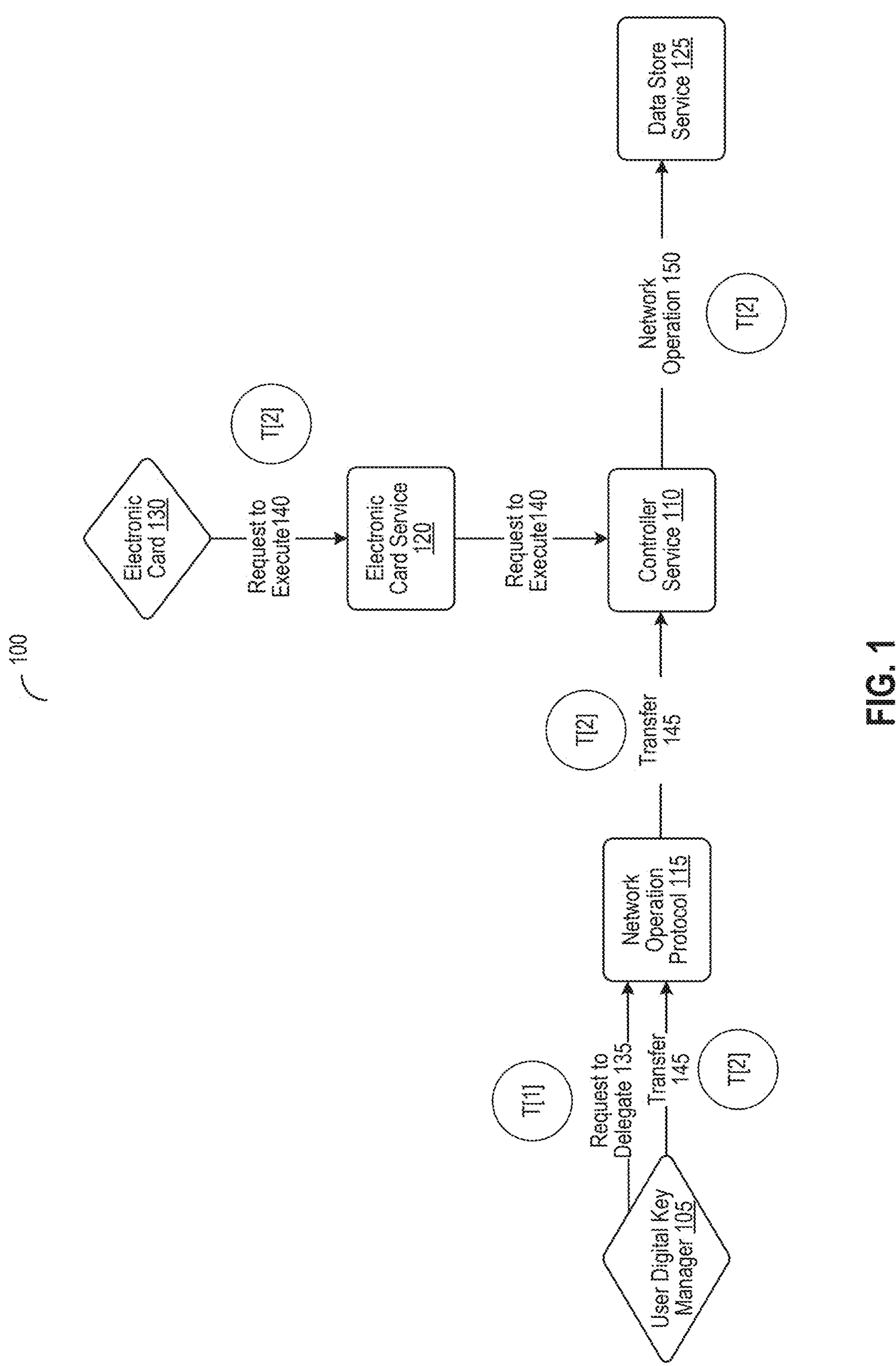
FIG. 1 depicts a block diagram of a system to carry out network operations on behalf of digital key managers, in accordance with an illustrative embodiment.

Reference will now be made to the illustrative embodiments illustrated in the drawings, and specific language will be used here to describe the same. Nevertheless, it will be understood that no limitation of the scope of the claims or this disclosure is intended. Alterations and further modifications of the inventive features illustrated herein, and additional applications of the principles of the subject matter illustrated herein, which would occur to one ordinarily skilled in the relevant art and having possession of this disclosure, are to be considered within the scope of the subject matter disclosed herein. The present disclosure is described here in detail with reference to embodiments illustrated in the drawings, which form a part here. Other embodiments may be used and/or other changes may be made without departing from the spirit or scope of the present disclosure. The illustrative embodiments described in the detailed description are not meant to be limiting of the subject matter presented here.

Presented herein are systems and methods for controlling the execution of operations via network operation to protocols for delegation in network environments. In conjunction with an issuance of an electronic card for a user, a controller service can construct a network operation protocol specifying logic for execution of operations on a digital distributed ledger for operations in connection with the use of the electronic card. The network operation protocol may function as a unified delegate authority for transfer of tokens from a digital key manager of the user on the distributed digital ledger. In the network operation protocol, a first component may specify which computing systems are permitted as destinations of tokens from the digital key manager of the user. A second component may specify a set of constraints, such as limit on the transferred value and a velocity of operations, on a per computing system basis. A third component may include logic to execute transfer of tokens from the digital key manager of the user to a digital key manager of the destination computing system. When the electronic card is used at a terminal associated with a computing system, the controller service may identify and execute the components of the network operation protocol to determine whether to permit the operation to be performed on behalf of the digital key manager of the user.

FIG. 1 depicts a block diagram of a system 100 to carry out network operations on behalf of digital key managers, in accordance with an illustrative embodiment. The system 100 may include at least one user digital key manager 105 (also referred herein as an externally owned account (EOA) or user crypto wallet), at least one controller service 110, at least one network operation protocol 115 (also referred here as a smart contract), at least one electronic card service 120, at least one data store service 125, among others. Prior to the creation of the network operation protocol 115, the electronic card service 120 may create an electronic card 130 for a user associated with the digital key manager 105. At the time of creation (T1), the user may specify which digital key manager 105 is to be linked with the electronic card 130. In connection with the linkage of the digital key manager 105 with the electronic card 130, the user device may send a request to delegate 135 to the controller service 110. The controller service 110 may receive the request to delegate 135 and may construct and deploy the network operation protocol 115 on distributed digital ledger.

When the electronic card 130 is used at a terminal associated with a computing system (T2), the terminal may send a request to execute 140 to the electronic card service 120. The electronic card service 120 may in turn send the request to execute 140 to the controller service 110. With receipt, the controller service 110 may determine the whether the request passes the controls (e.g., permitted destination, maximum limit, balance, and velocity) as specified in the network operation protocol 115. When the controls are satisfied, the controller service 110 may initiate a transfer 145 of tokens corresponding to the value in the request to execute 140 from the user digital key manager 105 to a digital key manager of the controller service 110. In conjunction, the controller service 110 may execute a network operation 150 with the data store service 125 to transfer a value from an account data structure associated with the controller service 110 to an account data structure associated with the computing system.

Under one use case, a user "A" may request the electronic card service 120 to issue the user an electronic card 130 (e.g., a debit or credit card) to link with user A's digital key manager 105 which holds some number of user A's tokens. In connection with the issuance, the electronic card service 120 may prompt user "A" via a user device to delegate authority to transfer tokens on behalf of the digital key manager 105 to the controller service 110. As the user indicates approval to delegate, the user may specify certain constraints on the delegation, such as a daily limit on the number of tokens or equivalent value that can be transferred. Once set, the user device may send the request to delegate 135 to the controller service 110.

The controller service 110 in turn can create the network operation protocol 115. The network operation protocol 115 can include three components with three distinct functions to control ledger operations on user A's behalf. The three components may include: (1) an admin component to configure authorized destination for transferring tokens; (2) a constraint component to set constraints such as a transaction limit and velocity of transactions on a per-merchant basis; and (3) a transfer component to execute transfer of tokens from the user A's digital key manager 105 to other digital key managers once approved. With the creation, the controller service 110 can add and deploy the network operation protocol 115 on the distributed digital ledger.

Later, user A visits a coffee house "Y" and uses the issued electronic card 130 to purchase a flat white with a price of $7.50. The electronic card 130 may be swiped and activated at point-of-sale (POS) terminal at coffee house Y. The POS terminal can send an authorization request through the electronic card service 120. The electronic card service 120 can forward the request to the controller service 110. Using the card number in the request, the controller service 110 may look up the network operation protocol 115 on the distributed digital ledger. The controller service 110 may use the admin component of the network operation protocol 115 to check whether coffee house Y is a permitted recipient of user A's tokens. The controller service 110 may use the constraint manager to determine whether the transaction satisfies the constraints.

When it is determined that coffee house Y is a permitted recipient and the constraints are satisfied, the controller service 110 may use the transfer component of the network operation protocol 115 to pull the tokens equivalent to $7.50 from user A's digital key manager 105 to the digital key manager of the controller service 110. The controller service 110 may request the data store service 125 (e.g., a bank server) to transfer the fiat amount of $7.50 from an account associated with the controller service 110 to an account associated with the coffee house Y. Throughout the process, the linkage between the card and user A's digital key manager 105 may remain persistent. The controller service 110 together with the network operation protocol 115 may ensure secure and compliant settlement of transactions on both the digital distributed ledger as well as fiat money on bank accounts.

Figure 2:
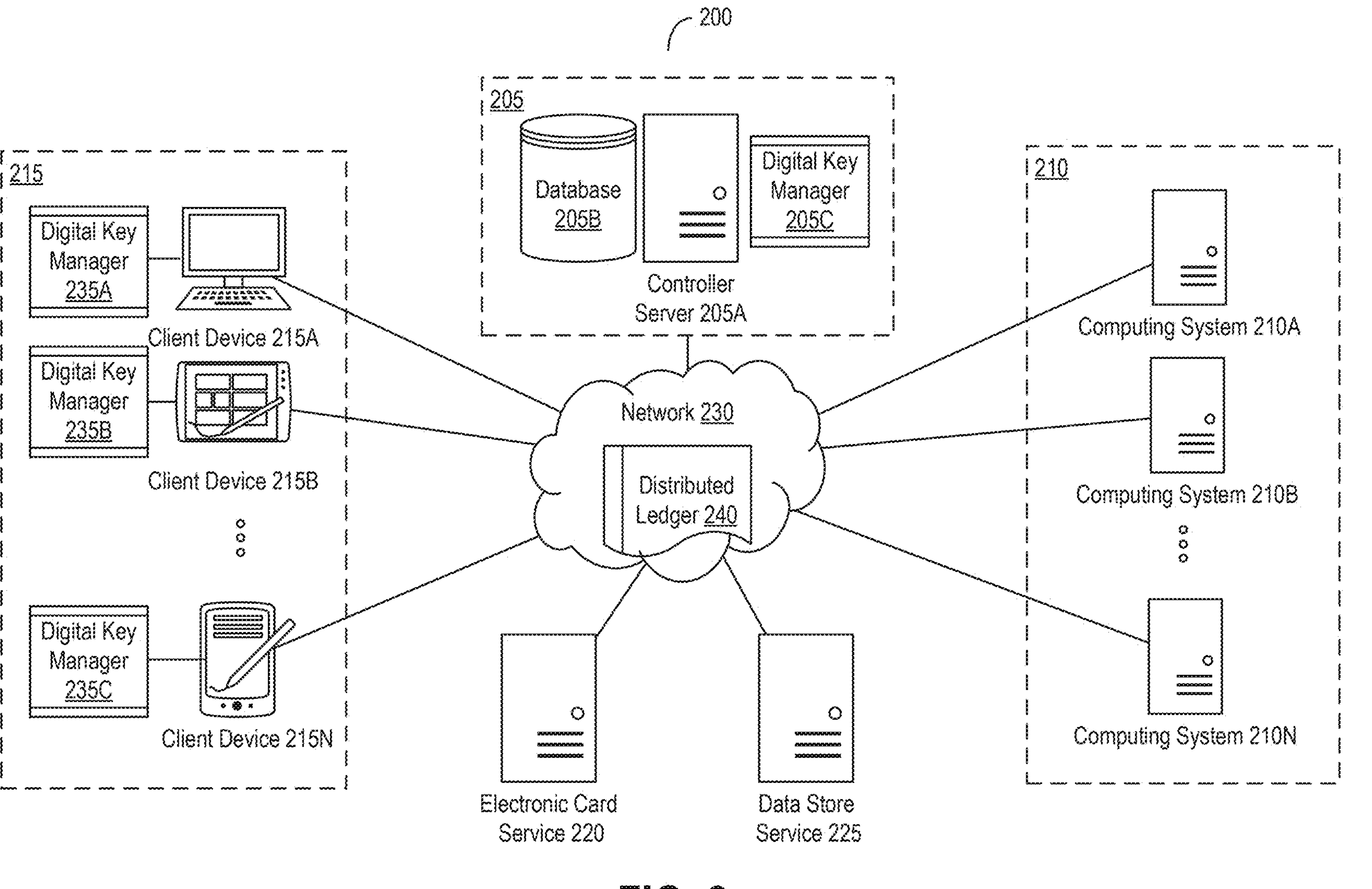
FIG. 2 depicts a block diagram of a system for controlling execution of operations via network operation protocols to delegate across services distributed in networked environments in accordance with an illustrative embodiment.

FIG. 2 depicts a block diagram of a system 200 for controlling execution of operations via network operation protocols to delegate across services distributed in networked environments. In brief overview, the system 200 may include at least one controller service 205, a set of computing systems 210A-N (hereinafter generally referred to as computing systems 210), a set of client device 215A-N (hereinafter generally referred to as client devices 215), at least one electronic card service 220, and at least one data store service 225, communicatively coupled with at least one network 230. The set of client devices 215 may be associated with a corresponding set of digital key managers 235A-N (hereinafter generally referred to as digital key managers 235). The network 230 may maintain, host, or otherwise include at least one distributed ledger 240, among others. Each of the components described in FIG. 2 may be implemented or performed using any one or more of the hardware or combination of software and hardware components detailed herein.

In the depicted embodiment, the controller service 205 may include at least one controller server 205A and at least one database 205B. The controller server 205A may be associated with at least one digital key manager 205C. The controller server 205A (sometimes herein referred to as a server or service) may be any computing device comprising of a processor and non-transitory, machine-readable storage capable of executing the various tasks and processes described herein. The controller server 205A may be associated with an entity to facilitate ledger operations on the distributed ledger 240 and network operations with the data store service 225. In some embodiments, the controller server 205A may be associated with a payments processor entity, handling requests received from computing systems 210 and by extension users or client devices 215.

The controller server 205A may employ various processors, such as a central processing unit (CPU) and graphics processing unit (GPU), among others. Non-limiting examples of such computing devices may include workstation computers, laptop computers, server computers, and the like. While the system 200 includes a single controller server 205A, the controller server 205A may include any number of computing devices operating in a distributed computing environment, such as a cloud environment. The controller server 205A may be in communication with the computing systems 210, the client devices 215, the electronic card service 220, and the data store service 225 via the network 230. While the system 200 includes a single controller server 205A, the controller server 205A may include any number of computing devices operating in a distributed computing environment, such as a cloud environment. The controller server 205A may be situated, located, or otherwise associated with at least one server group. Each server group may correspond to a data center, a branch office, or a site at which a subset of servers is situated or associated.

In some embodiments, the controller server 205A may be a cloud storage service provider corresponding to a distributed group of servers on a cloud network. In some embodiments, the controller server 205A may be a workstation computer, laptop computer, phone, tablet computer, or server computer, among others. The database 205B may store and maintain data for various operations in the system 200. The database 205B may be in communication with the computing systems 210, the client devices 215, the electronic card service 220, and the data store service 225 via the network 230. In some embodiments, the database 205B may include a database management system (DBMS) to arrange and organize the data maintained across the databases. In some embodiments, the database 205B may be a part of the controller server 205A. In some embodiments, the database 205B may be separate from the controller server 205A.

Each computing system 210 (sometimes herein referred to as a network entity or a server) may be any computing device comprising of a processor and a non-transitory, machine-readable storage medium capable of performing the various tasks and processes described herein. The computing system 210 may be associated with a merchant platform offering products or services to end users associated with client devices 215. In some embodiments, the computing system 210 may be associated with a platform entity for merchant platforms to facilitate processing of network operations (e.g., transaction processing). The computing system 210 may employ various processors, such as a central processing unit (CPU) and graphics processing unit (GPU), among others. Non-limiting examples of such computing devices may include workstation computers, laptop computers, server computers, and the like. While the system 200 includes a single computing system 210, the computing infrastructure may include any number of computing devices operating in a distributed computing environment, such as a cloud environment. The computing system 210 may be in communication with the controller service 205, the client devices 215, the electronic card service 220, and the data store service 225, among others, via the network 230. The computing system 210 may be situated, located, or otherwise associated with at least one server group. Each server group may correspond to a data center, a branch office, or a site at which a subset of servers is situated or associated. In some embodiments, the computing system 210 may be a cloud storage service provider corresponding to a distributed group of servers on a cloud network. In some embodiments, the computing system 210 may be a workstation computer, laptop computer, phone, tablet computer, or server computer, among others.

The client devices 215 can include, without limitation, a personal computing device 215A, a mobile device 215B, and one or more other computing server/platforms 210C (e.g., operating on behalf of a user). Even though referred herein as "user" devices, these devices may not always be operated by users. Each of the client devices 215 may be configured to communicate over one or more networks 230 with the computing systems 210. Each client device 215 may be associated with an end user accessing various resources and functions provided by the computing system 210 through the network 230. For example, the end user of the client device 215 may communicate and access the resources of the computing system 210, such as searching through the webpages of products or services provided by an entity associated with the computing system 210. Each client device 215 may be in communication with the controller service 205, the computing system 210, the electronic card service 220, and the data store service 225, among others, via the network 230.

The electronic card service 220 (sometimes herein referred to as a server or a service) may be any computing device comprising of a processor and a non-transitory, machine-readable storage medium capable of performing the various tasks and processes described herein. The electronic card service 220 may be associated with an entity for issuing electronic cards to users associated with client devices 215. The electronic card service 220 may be in communication with the controller service 205, the computing system 210, the client devices 215, and the data store service 225, among others, via the network 230. In some embodiments, the electronic card service 220 may be part of the controller service 205. In some embodiments, the electronic card service 220 may be part of the data store service 225. In some embodiments, the electronic card service 220 may be separate from the controller service 205 or the data store service 225 (e.g., as depicted).

The electronic card service 220 may employ various processors, such as a central processing unit (CPU) and graphics processing unit (GPU), among others. Non-limiting examples of such computing devices may include workstation computers, laptop computers, server computers, and the like. While the system 200 includes a single electronic card service 220, the electronic card service 220 may include any number of computing devices operating in a distributed computing environment, such as a cloud environment. The electronic card service 220 may be situated, located, or otherwise associated with at least one server group. Each server group may correspond to a data center, a branch office, or a site at which a subset of servers is situated or associated. In some embodiments, the electronic card service 220 may be a cloud storage service provider corresponding to a distributed group of servers on a cloud network. In some embodiments, the electronic card service 220 may be a workstation computer, laptop computer, phone, tablet computer, or server computer, among others.

The data store service 225 (sometimes herein referred to as a server or a service) may be any computing device comprising of a processor and a non-transitory, machine-readable storage medium capable of performing the various tasks and processes described herein. The data store service 225 may be associated with an entity for maintaining accounts (e.g., bank or card accounts) on behalf of other entities in the system 200, such as the entity associated with the controller service 205, the entity associated with the computing system 210, the entity associated with the client device 215, or the entity associated with the electronic card service 220. The data store service 225 may be in communication with the controller service 205, the computing system 210, the client devices 215, and the electronic card service 220, among others, via the network 230. In some embodiments, the data store service 225 may be part of the controller service 205. In some embodiments, the data store service 225 may be part of the electronic card service 220. In some embodiments, the data store service 225 may be separate from the controller service 205 or the electronic card service 220 (e.g., as depicted).

The data store service 225 may employ various processors, such as a central processing unit (CPU) and graphics processing unit (GPU), among others. Non-limiting examples of such computing devices may include workstation computers, laptop computers, server computers, and the like. While the system 200 includes a single data store service 225, the data store service 225 may include any number of computing devices operating in a distributed computing environment, such as a cloud environment. The data store service 225 may be situated, located, or otherwise associated with at least one server group. Each server group may correspond to a data center, a branch office, or a site at which a subset of servers is situated or associated. In some embodiments, the data store service 225 may be a cloud storage service provider corresponding to a distributed group of servers on a cloud network. In some embodiments, the data store service 225 may be a workstation computer, laptop computer, phone, tablet computer, or server computer, among others.

On the network 230, the distributed ledger 240 (e.g., a blockchain) may be hosted and maintained across one or more network nodes within the network 230 (or the system 200). The distributed ledger 240 may be in accordance with any number of protocols, such as Ethereum, Bitcoin, Cardano, Solana, Tron, Tezos, or Avalanche, among others. The network nodes supporting the distributed ledger 240 may include the controller service 205, among others. The distributed ledger 240 may include a set of data records. Each data record may correspond to an operation performed in the network 230 or the system 200. Each data record corresponding to a given operation may be linked with a previous data record corresponding to a prior operation. Each network node may maintain and update its own instance of the distributed ledger 240 via a consensus algorithm (e.g., a proof-of-work (PoW) protocol, proof-of-stake (POS) protocol, proof of delegated stake (PoDS), proof of authority (PoA), proof of delegated authority (PdoA), or Practical Byzantine Fault Tolerance (PBFT)). The distributed ledger 240 may function or serve as the authoritative record of token assignments in the network 230. The set of data records of the distributed ledger 240 may indicate or keep track of assignments of token.

Each digital key manager (e.g., the digital key manager 235 associated with the client device 215 or the digital key manager 205C associated with the controller service 205) may include a device, a physical medium, or a combination of software and hardware to store and maintain cryptographic keys (e.g., public and private keys) for ledger operations on the distributed ledger 240. At least one digital key manager may be assigned with a number of tokens. Each token may correspond to a unit of value (e.g., fiat currency or assets) to be transferred across various accounts associated with digital key managers and recorded on the data records of the distributed ledger 240. The assignment of tokens to a particular digital key manager may represent ownership or possession of tokens by the entity associated with the digital key manager. The digital key manager 235 associated with the client device 215 may be assigned tokens on behalf of the user of the client device 215. The digital key manager 205C may be assigned tokens on behalf of the controller service 205 or the computing systems 210 (e.g., as part of network operations). In some embodiments, the digital key manager may be an externally owned account (EOA). The EOA may be controlled via the cryptographic keys assigned to the entity for the digital key manager. For instance, the digital key manager may be associated with an account of the given entity (e.g., end user associated with the client device 215 or the entity managing the controller service 205). In some embodiments, the digital key manager may be a smart contract wallet (e.g., an application for managing assignment of tokens).

The above-mentioned components may be connected to each other through a network 230. The examples of the network 230 may include, but are not limited to, private or public LAN, WLAN, MAN, WAN, and the Internet. The network 230 may include both wired and wireless communications according to one or more standards and/or via one or more transport mediums. The communication over the network 230 may be performed, in accordance with various communication protocols, such as Transmission Control Protocol and Internet Protocol (TCP/IP), User Datagram Protocol (UDP), and IEEE communication protocols. In one example, the network 230 may include wireless communications according to Bluetooth specification sets or another standard or proprietary wireless communication protocol. In another example, the network 230 may also include communications over a cellular network, including, e.g., a GSM (Global System for Mobile Communications), CDMA (Code Division Multiple Access), and/or EDGE (Enhanced Data for Global Evolution) network. The architecture and components described herein may be used to implement the following systems and methods.

Figure 3:
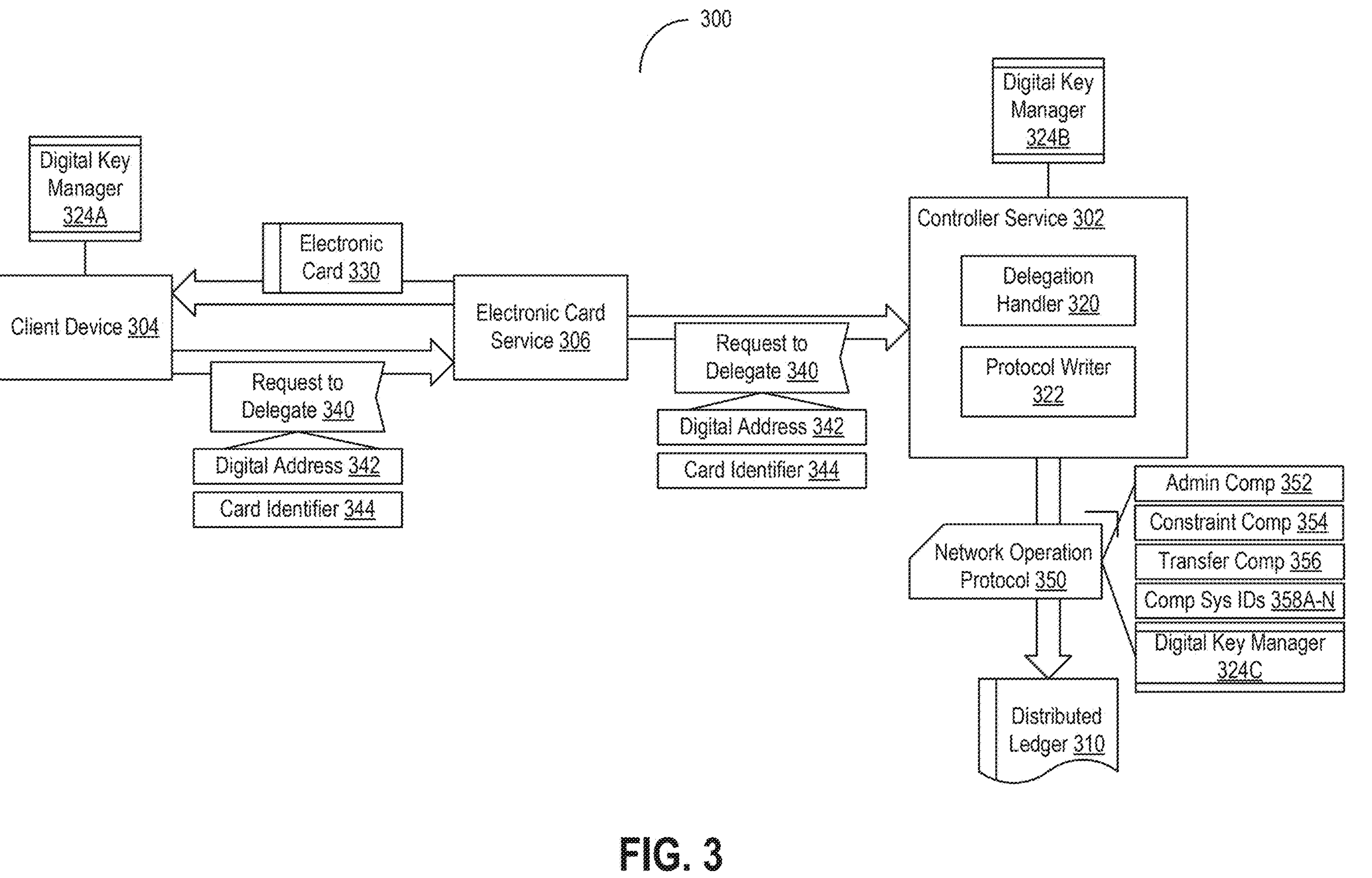
FIG. 3 depicts a block diagram of a system for creating network operation protocols for delegation from digital key managers of client devices in accordance with an illustrative embodiment.

FIG. 3 depicts a block diagram of a system 300 for creating network operation protocols for delegation from digital key managers of client devices. In brief overview, the system 300 may include at least one controller service 302, at least one client device 304, at least one electronic card service 306, and at least one distributed ledger 310, among others. The controller service 302 may include at least one delegation handler 320 and at least one protocol writer 322, among others. The client device 304 may be associated with at least one digital key manager 324A. The controller service 302 may be associated with at least one digital key manager 324B. The embodiments may comprise additional or alternative components, or omit certain components from those of FIG. 3, and still fall within the scope of this disclosure. Various hardware and software components of one or more public or private networks may interconnect the various components of the system 300. Each component in system 300 may be any computing device comprising one or more processors coupled with memory and software and capable of performing the various processes and tasks described herein.

The electronic card service 306 may create, produce, or otherwise generate at least one electronic card 330 (sometimes herein referred to as a digital card or a virtual card) for a user associated with the client device 304. The electronic card 330 may correspond to or include one or more data structures to enable or facilitate execution of network operations for the user. For example, the electronic card 330 may be a virtual card (e.g., a credit or debit card) to be used by the user to make transactions with merchant entities by activation (e.g., swiping at a point-of-sale (POS) terminal) of the virtual card. The electronic card 330 may be linked with or associated with the digital key manager 324A. The virtual card may be linked with the digital key manager 324A to enable or facilitate ledger operations on the distributed ledger 310 using tokens assigned to the digital key manager 324A, in at least partial concurrence with the execution of the network operation. In the electronic card 330, the data structures may identify or include one or more of: a card identifier (e.g., a card number); an expiration date; a security code (e.g., a card verification value (CVC)); a card holder identifier (e.g., name of the user); or address (e.g., physical address of the user), among others. In some embodiments, the electronic card 330 may correspond to or may be a physical card to facilitate execution of operations for the user. For instance, an entity associated with the electronic card service 306 may also provide a physical card in conjunction with a digital card for transactions.

With the generation of the electronic card 330, the electronic card service 306 may transmit, send, or otherwise provide the electronic card 330 to the client device 304 or the user associated with the client device 304. In some embodiments, the electronic card service 306 may send a message to prompt the user of the client device 304 to delegate authority from the digital key manager 324A to the controller service 302 (or the digital key manager 324B associated with the controller service 302). For example, as part of the linking of the electronic card 330 with the digital key manager 324A, the electronic card service 306 may transmit the message to cause the client device 304 to display the prompt to direct the user to delegate the authority from the digital key manager 324A to the controller service 302.

The client device 304 may in turn retrieve, obtain, or otherwise receive the electronic card 330 (e.g., when in the form of a virtual card) from the electronic card service 306. With receipt, the client device 304 may add or include the electronic card 330 to a digital wallet. The digital wallet may correspond to or may be an application executing on the client device 304 to store and maintain the data structures of the electronic card 330. The digital wallet may allow the user of the client device 304 to use the electronic card 330 with POS terminal devices via an input/output (I/O) device (e.g., near-field communication (NFC)) of the client device 304. In some embodiments, the client device 304 may receive the message to prompt the user to delegate authority in conjunction with the electronic card 330. With receipt, the client device 304 may display the prompt to direct the user to delegate authority from the digital key manager 324A to the controller service 302.

The client device 304 may provide, send, or otherwise transmit at least one request to delegate 340. The request to delegate 340 may be transmitted to the electronic card service 306 (e.g., as depicted) or directly to the controller service 302. The request to delegate 340 may be generated and sent in response an indication of acceptance of the prompt from the electronic card service 306. The request to delegate 340 may identify or include at least one digital address 342 of the digital key manager 324A and at least one card identifier 344 corresponding to the electronic card 330, among others. The digital address 342 may be a unique identifier to reference the digital key manager 324A of the user. In some embodiments, the request to delegate 340 may identify or include a maximum value for transfer of tokens (or equivalent value) assigned to the digital key manager 324A on the distributed ledger 310. The digital key manager 324A may be assigned with one or more tokens on the distributed ledger 310. The electronic card 330 may be linked with or associated with the digital key manager 324A. The linkage may be completed or finalized upon indication of the acceptance of the delegation of the authority. In some embodiments, the electronic card service 306 may receive the request to delegate 340 from the client device 304 and may send or forward the request to delegate 340 to the controller service 302.

The delegation handler 320 on the controller service 302 may retrieve, obtain, or otherwise receive the request to delegate 340 from the electronic card service 306 or from the client device 304 via the electronic card service 306. With receipt, the delegation handler 320 may process or parse the request to delegate 340 to extract or identify the digital address 342 of the digital key manager 324A and the card identifier 344 of the electronic card 330. In some embodiments, the delegation handler 320 may identify the maximum value for transfer of tokens (or equivalent value) from the request to delegate 340. In some embodiments, the delegation handler 320 may determine or identify the delegation of authority from the digital key manager 324A to the controller service 302 based on the receipt of the request to delegate 340. The delegation handler 320 may perform or execute a delegation mechanism in accordance with a protocol the distributed ledger 310. The delegation handler 320 may store and maintain an association between the digital address 342 and the card identifier 344 on a database.

In response to the receipt of the request to delegate 340, the protocol writer 322 on the controller service 302 may create, generate, or otherwise construct at least one network operation protocol 350. The network operation protocol 350 may be associated with the tokens assigned to the digital key manager 324A or the user associated with the digital key manager 324A. The network operation protocol 350 may correspond to or may be executable code (e.g., to be read and executed by nodes on the network hosting the distributed ledger 310) used to regulate or control execution of operations on behalf of the digital key manager 324A of the user. For example, the network operation protocol 350 may be a smart contract to be deployed on the distributed ledger 310 in accordance with the protocol of the distributed ledger 310. The network operation protocol 350 may identify or include at least one administrator component 352 (sometimes herein generally referred to as a first component), at least one constraint component 354 (sometimes herein generally referred to as a second component), and at least one transfer component 354 (sometimes herein generally referred to as a third component), among others. In some embodiments, the network operation protocol 350 may include or be associated with at least one digital key manager 324C. In some embodiments, the network operation protocol 350 may include or be associated with the digital address 342 of the digital key manager 342A from which the delegation authority originates.

The administrator component 352 may regulate or control transfer of assignment of tokens from the digital key manager 324A of the user to the digital key manager 324B of the controller service 302 on behalf of at least one of a set of computing systems. The administrative component 352 may indicate or identify the computing systems for which transfer of the assignment of tokens from the digital key manager 324A to the digital key manager 324B is permitted or authorized. For example, the administrative component 352 may specify that the assignment of tokens are permitted to be transferred from the digital key manager 324A of the user to the digital key manager 324B of the controller service 302, when executing operations with one of the authorized computing systems. In some embodiments, the administrative component 352 (or the network operation protocol 350) may identify or include a set of identifiers 358A-N (hereinafter generally referred to as identifiers 358) corresponding to the set of computing systems. Each identifier 358 may reference or correspond to a respective computing system that is authorized, for which the assignment of tokens are permitted to be transferred from the digital key manager 324A of the user to the digital key manager 324B of the controller service 302.

The constraint component 354 may define, configure, or set one or more constraints on the execution of ledger operations on the distributed ledger 310 for transferring the assignment of tokens from the digital key manager 324A of the user to the digital key manager 324B of the controller service 302. The one or more constraints of the constraint component 354 may identify or include: a maximum value for transfer of tokens (or the equivalent value) from the digital key manager 324A; a limit on transfers (e.g., number or rate of transfers) over a time period (e.g., ranging between 1 hour to 1 month); a remaining value (e.g., minimum number of equivalent tokens) of the digital key manager 324A; or a maximum rate of executions, among others. The one or more constraints defined by the constraint component 354 may be on a per computing system basis. For example, for each authorized computing system as identified by the administrative component 352, the constraint component 354 may specify one or more respective constraints. The constraints for one computing system may at least partially differ from the constraints for another computing system. In some embodiments, the constraint component 354 may keep track of metrics associated with the digital key manager 324A to check against the constraints. Each time an activity is detected, the constraint component 354 may update and record the metrics. The metrics may include, for example, remaining tokens, number of transfers, rate transfer of tokens, a timestamp for each transfer, among others.

The transfer component 356 may perform, carry out, or execute ledger operations on the distributed ledger 310 to transfer the assignment of tokens from the digital key manager 324A of the user to the digital key manager 324B. The transfer component 356 may execute the ledger operations in response to the administrative component 352 determining that the tokens are permitted to be transferred from the digital key manager 324A for the authorized computing system and to the constraint component 354 determining that the constraints are satisfied. In some embodiments, the transfer component 356 may include at least one cryptographic key for performance of the ledger operations. In some embodiments, the digital key manager 324C may be specific to the network operation protocol 350. The digital key manager 324C may be of a similar instance of the digital key manager 324A and 324B. The digital key manager 324C may be assigned with the tokens on the distributed ledger 310, as the assignment of the tokens are transferred from the digital key manager 324A of the user to the digital key manager 324B of the controller service 302.

With the construction, the protocol writer 322 may store, include, or otherwise add the network operation protocol 350 on the distributed ledger 310. To add, the protocol writer 322 may communicate with the nodes of the network supporting the distributed ledger 310. From communicating, the protocol writer 322 or the nodes (or both) may perform validation of the network operation protocol 350. With the validation of the network operation protocol 350, each of the nodes can insert the network operation protocol 350 to the distributed ledger 310. Upon insertion, each node in the network may store and maintain the executable code corresponding to the distributed ledger 310. On the distributed ledger 310, the network operation protocol 350 may permit use or transfer of the tokens by the digital key manager 324B of the controller service 302 in accordance with the defined constraints.

Figure 4:
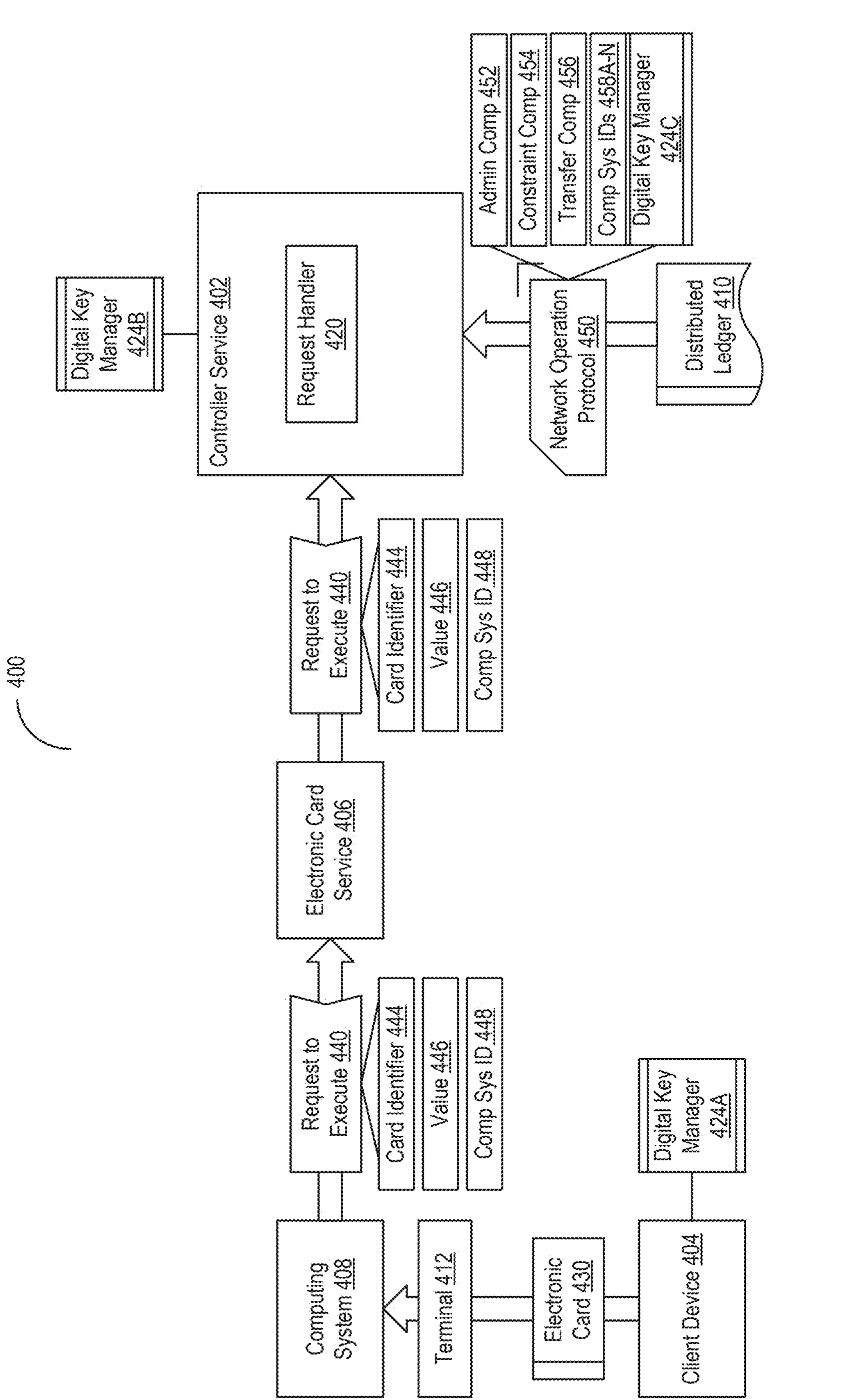
FIG. 4 depicts a block diagram of a system for handling requests to execute network operations in response to activations of electronic cards in accordance with an illustrative embodiment.

FIG. 4 depicts a block diagram of a system 400 for handling requests to execute network operations in response to activations of electronic cards. In brief overview, the system 400 may include at least one controller service 402, at least one client device 404, at least one electronic card service 406, at least one computing system 408, at least one distributed ledger 410, and at least one terminal 412, among others. The controller service 402 may include at least one request handler 420, among others. The terminal 412 may be associated with the computing system 408. The embodiments may comprise additional or alternative components, or omit certain components from those of FIG. 4, and still fall within the scope of this disclosure. Various hardware and software components of one or more public or private networks may interconnect the various components of the system 400. Each component in system 400 may be any computing device comprising one or more processors coupled with memory and software and capable of performing the various processes and tasks described herein.

The computing system 408 may receive, identify, or detect an activation of an electronic card 430 using the terminal 412. The terminal 412 may include an electronic device (e.g., a point-of-sale (POS) terminal) configured to receive information from the electronic card 430. The information received by the terminal 412 from the electronic card 430 may include, for example, one or more of: a card identifier (e.g., a card number); an expiration date; a security code (e.g., a card verification value (CVC)); a card holder identifier (e.g., name of the user); or address (e.g., physical address of the user), among others. For example, to make a transaction for a foodstuff of a given value at a grocery store, a user may bring the client device 404 loaded with the electronic card 430 on a mobile wallet application, and may hold the client device 404 towards the terminal 412 at the grocery store. When within a proximity of the terminal 412, the terminal 412 may read the information of the electronic card 430 (e.g., card identifier and name of card holder) from the client device 404. The terminal 412 may send the information to the electronic card 430 along with the value for the transaction to the computing system 408.

With the detection of the activation, the computing system 408 may provide, transmit, or otherwise send a request to execute 440 to the electronic card service 406. The request to execute 440 may be a request to execute operations (e.g., network or ledger operations). The request to execute 440 may identify or include at least one card identifier 444 of the electronic card 430. The electronic card 430 identified by the card identifier 444 may be linked with or associated with the digital key manager 424A of the user. The request to execute 440 may also identify or include at least one value 446 to be transferred from a data structure associated with the user of the client device 404 to a data structure associated with the computing system 408. The value 446 may be a numerical amount (e.g., in the form of an integer, double, or floating number) associated with the request to execute 440. For example, the request to execute 440 may contain the card number of the electronic card 430 activated at the terminal 412. The request to execute 440 may also specify an amount for the transaction of a product or service provided by the entity associated with the computing system 408 to be transferred to a bank account of the entity of the computing system 408. The request to execute 440 may also identify or include at least identifier 448 corresponding to the computing system 408. The electronic card service 406 in turn may receive the request to execute 440 from the computing system 408 and may forward or send the request to execute 440 to the controller service 402.

The request handler 420 on the controller service 402 may retrieve, identify, or otherwise receive the request to execute 440 in response to activation of the electronic card 430 using the terminal 412 of the computing system 408. With the receipt, the request handler 420 may process or parse the request to execute 440 to extract or identify the card identifier 444, the value 446, and the identifier 448 of the computing system 408 from the request to execute 440. Using the card identifier 444, the request handler 420 may determine or identify a digital address of the digital key manager 424A of the user. For instance, the request handler 420 may use the card identifier 444 to search on a database for the digital address that is linked or associated with the card identifier 444. In some embodiments, the request handler 420 may calculate, identify, or otherwise determine a number of tokens equivalent to the value 446. The number of equivalent tokens may be determined in accordance with an exchange rate between the value 446 (e.g., fiat currency) and the number of tokens. The exchange rate may be retrieved from a network service (e.g., platform for the protocol used for the distributed ledger 410).

From the distributed ledger 410, the request handler 420 on the controller service 402 may select or identify at least one network operation protocol 450. The network operation protocol 450 may be associated with the tokens assigned to the digital key manager 424A or the user associated with the digital key manager 424A. In some embodiments, the request handler 420 may identify the network operation protocol 450 using the digital address of the digital key manager 424A. The network operation protocol 450 may identify or include at least one administrator component 452 (sometimes herein generally referred to as a first component), at least one constraint component 454 (sometimes herein generally referred to as a second component), and at least one transfer component 454 (sometimes herein generally referred to as a third component), among others. In some embodiments, the network operation protocol 450 may identify or include a set of identifiers 458A-N corresponding to a set of authorized computing systems. In some embodiments, the network operation protocol 450 may include or be associated with at least one digital key manager 424C.

Figure 5:
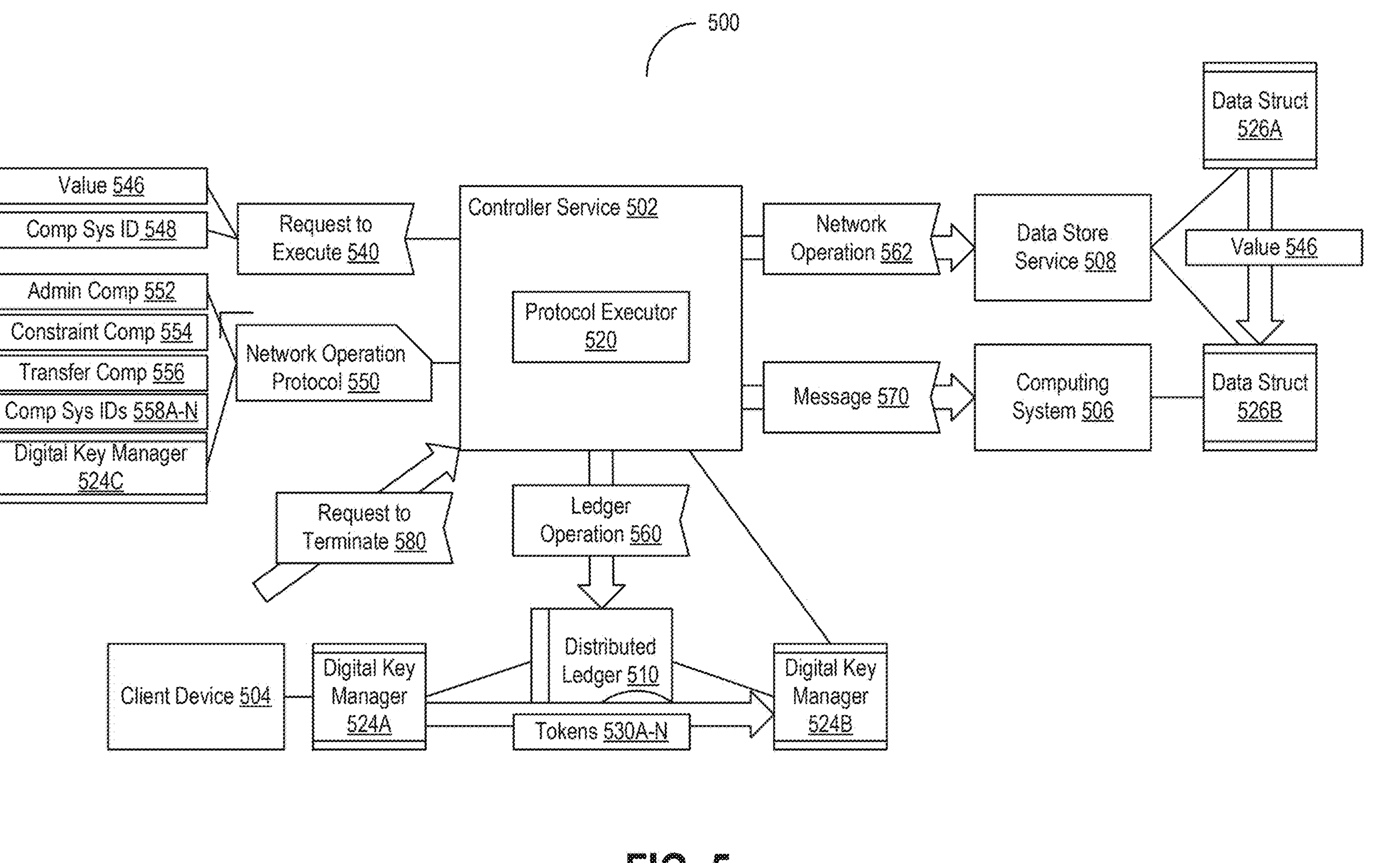
FIG. 5 depicts a block diagram of a system for executing ledger operations and network operations in accordance with an illustrative embodiment.

FIG. 5 depicts a block diagram of a system 500 for executing ledger operations and network operations. In brief overview, the system 500 may include at least one controller service 502, at least one client device 504, at least one computing system 506, at least one data store service 508, and at least one distributed ledger 510, among others. The controller service 502 may include at least one protocol executor 520. The client device 504 may be associated with at least one digital key manager 524A. The controller service 502 may be associated with at least one digital key manager 524B. The data store service 508 may store and maintain at least one data structure 526A associated with the controller service 502 and at least one data structure 526B associated with the computing system 506. The embodiments may comprise additional or alternative components, or omit certain components from those of FIG. 5, and still fall within the scope of this disclosure. Various hardware and software components of one or more public or private networks may interconnect the various components of the system 500. Each component in system 500 may be any computing device comprising one or more processors coupled with memory and software and capable of performing the various processes and tasks described herein.

With the receipt of a request to execute 540, the protocol executor 520 on the controller service 502 may invoke, perform, or otherwise execute at least one network operation protocol 550 associated with the tokens assigned to the digital key manager 524A or the user associated with the digital key manager 524A. The network operation protocol 550 may correspond to or may be executable code (e.g., to be read and executed by nodes on the network hosting the distributed ledger 510) used to regulate or control execution of operations on behalf of the digital key manager 524A of the user. The network operation protocol 550 may identify or include at least one administrator component 552, at least one constraint component 552, and at least one transfer component 554, among others. In some embodiments, the network operation protocol 450 may identify or include a set of identifiers 558A-N (herein generally referred to as identifiers 558) corresponding to a set of authorized computing systems. In some embodiments, the network operation protocol 550 may include or be associated with at least one digital key manager 524C.

Using the administrator component 552, the protocol executor 520 may identify or determine whether the assignment of tokens 530A-N (hereinafter generally referred to as tokens 530) is permitted to be transferred from the digital key manager 524A to the digital key manager 524B of the controller service 502. To determine, the protocol executor 520 may extract or identify an identifier 548 corresponding to the computing system 506 from the request to execute 540. With the identification, the protocol executor 520 may compare the identifier 548 from the request to execute 540 with the set of identifiers 558 identified in the network operation protocol 550. If the identifier 548 matches at least one of the set of identifiers 558, the protocol executor 520 may determine that the assignment of tokens 530 is permitted to be transferred from the digital key manager 524A to the digital key manager 524B of the controller service 502 on behalf of the computing system 506. On the other hand, if the identifier 548 does not match to any of the set of identifiers 558, the protocol executor 520 may determine that the assignment of tokens 530 is not permitted to be transferred from the digital key manager 524A to the digital key manager 524B of the controller service 502 on behalf of the computing system 506.

In accordance with the constraint component 554, the protocol executor 520 may identify or determine whether a set of constraints for the computing system 506 is satisfied based on the request to execute 540. When the assignment of tokens 530 is permitted to be transferred, the protocol executor 520 may select or identify the set of constraints defined by the constraint component 554 for the computing system 506, using the identifier 548 corresponding to the computing system 506. The set of constraints for the computing system 506 may identify or include: a maximum value for transfer of tokens (or the equivalent value) from the digital key manager 524A; a limit on transfers (e.g., number or rate of transfers) over a time period (e.g., ranging between 1 hour to 1 month); a remaining value (e.g., minimum number of equivalent tokens) of the digital key manager 524A; or a maximum rate of executions, among others. The constraint component 554 may have kept track of metrics associated with the digital key manager 524A, such as remaining tokens, number of transfers, rate transfer of tokens, a timestamp for each transfer, among others.

To determine, the protocol executor 520 may check metrics associated with the digital key manager 524A of the against the set of constraints. When the metrics are within the constraints, the protocol executor 520 may determine that set of constraints for the computing system 506 is satisfied. For example, the protocol executor 520 may identify that the number of remaining tokens 530 assigned to the digital key manager 524A is 100 and that the number of transfers over the past week is 5. The constraints may specify a minimum of 10 tokens and the maximum number of transfers over a given week is 20. In this scenario, since the number of remaining tokens 530 is greater than the specified minimum number of tokens and the number of transactions over the week is less than the specified maximum number of transfers over any given week, the protocol executor 520 may determine that set of constraints for the computing system 506 is satisfied. Conversely, when the metrics are outside the constraints, the protocol executor 520 may determine that set of constraints for the computing system 506 is not satisfied. For instance, the protocol executor 520 may identify that value 546 identified in the request to execute 540 is equivalent to 20 tokens. The constraints may specify a maximum value that is equivalent to 5 tokens in a single transfer. Because the tokens corresponding to the value 546 is greater than the maximum value of the constraints, the protocol executor 520 may determine that set of constraints for the computing system 506 is not satisfied.

In some embodiments, the protocol executor 520 may identify or determine whether execution controls for ledger and network operations are satisfied for the request to execute 540. The execution controls may be separate from the constraints defined by the constraint component 554 of the network operation protocol 550. The execution controls may include, for example, a limit on transfers for a given user, a remaining value equivalent to tokens 530 assigned to the digital key manager 524A, or a velocity of transfers, among others. The protocol executor 520 may keep track of metrics for the digital key manager 524A separate from the constraint component 554 of the network operation protocol 550. The protocol executor 520 may check the metrics against the execution controls. When the metrics are within the range specified by the execution controls, the protocol executor 520 may determine that the execution controls are satisfied. Conversely, when the metrics are outside the range specified by the execution controls, the protocol executor 520 may determine that the execution controls are not satisfied.

When the tokens 530 is determined to be permitted to be transferred and the constraints are determined to be satisfied, the protocol executor 520 may invoke or use the transfer component 556 to execute at least one ledger operation 560 on the distributed ledger 510. In some embodiments, when the tokens 530 is determined to be permitted to be transferred, the constraints are determined to be satisfied, and the execution controls are satisfied, the protocol executor 520 may invoke or use the transfer component 556 to execute the ledger operation 560. In executing the ledger operation 560, the protocol executor 520 may change or transfer assignment of the tokens 530 from the digital key manager 524A of the user to the digital key manager 524B of the controller service 502. In performing the ledger operation 560, the protocol executor 520 may apply or use the cryptographic key of the transfer component 556. In some embodiments, the protocol executor 520 may change or transfer assignment of the tokens 530 from the digital key manager 524A via the digital key manager 524C to the digital key manager 524B. The tokens 530 may be assigned to the digital key manger 524C until completion of a corresponding network operation with the data store service 508. The protocol executor 520 may communicate with nodes of the network supporting the distributed ledger 510 in executing the ledger operation 560. Each node may be executing the network operation protocol 550 and may reach the same outcome in the determinations by the administrator component 552 and the constraint component 554. With the same outcome, the assignment of tokens 530 may be transferred from the digital key manager 524A of the user to the digital key manager 524B of the controller service 502.

In conjunction, the protocol executor 520 may carry out, perform, or execute at least one network operation 562 with the data store service 508. When the tokens 530 is determined to be permitted to be transferred and the constraints are determined to be satisfied (and the execution controls are satisfied), the protocol executor 520 may execute the network operation 562. In some embodiments, the protocol executor 520 may execute the network operation 562 at least in partial concurrence with the ledger operation 560. In some embodiments, the protocol executor 520 may execute the network operation 562 subsequent to completion of the ledger operation 560. The data store service 508 may store and maintain the data structure 526A (e.g., defining a bank account) associated with the controller service 502 and the data structure 526B (e.g., defining a bank account) associated with the computing system 506. Each data structure 526A and 526B may keep track of a value (e.g., a numerical value) assigned with the controller service 502 and the computing system 506 respectively. In executing the network operation 562, the protocol executor 520 (with the data store service 508) may transfer the value 546 from the data structure 526A of the controller service 502 to the data structure 526B of the computing system 506. With the completion of the ledger operation 560 and the network operation 562, the protocol executor 520 may provide, send, or otherwise transmit at least one message 570 to indicate completion of the request to execute 540. The computing system 506 may forward or send the indication of the completion in the message 570 to the client device 504.

On the other hand, when the tokens 530 is determined to be not permitted to be transferred or the constraints are determined to be not satisfied, the protocol executor 520 may refrain from performing the ledge operation 560 and the network operation 562. In some embodiments, when the execution controls are determined to be not satisfied, the protocol executor 520 may refrain from performing the ledge operation 560 and the network operation 562. The assignment of tokens 530 may remain with the digital key manager 524A of the user and not the digital key manager 524B of the controller service 502. In addition, the protocol executor 520 may provide, send, or otherwise transmit at least one message 570 to indicate failure to validate against the network operation protocol 550 in connection with the request to execute 540. The computing system 506 may forward or send the indication of failure in the message 570 to the client device 504.

In some embodiments, the protocol executor 520 may retrieve, obtain, or otherwise receive at least one request to terminate 580 from the client device 504 or from an electronic card service. The request to terminate 580 may be to cease or remove the delegation authority from the digital key manager 524A to the digital key manager 524B of the controller service 502. The request to terminate 580 may be transmitted in accordance with a mechanism of the protocol of the distributed ledger 510 to take away the delegation authority. For example, the user of the client device 504 may close the account for the electronic card that is linked with the digital key manager 524A. From closing, the client device 504 or the electronic card service may send the request to terminate 580 to the controller service 502. With receipt, the protocol executor 520 may deactivate or disable the network operation protocol 550 on the distributed ledger 510. By disabling the network operation protocol 550, the protocol executor 520 may revoke permission to transfer the tokens 530 assigned to the digital key manager 524A of the user to the digital key manager 524B of the controller service 502.

In this manner, the network operation protocol with the components as detailed herein can act as a unified delegate in transferring tokens on behalf of the digital key manager of the user linked with the electronic card issued to the user. As the unified delegate, the network operation protocol can effectuate much more granular constraints and checks on a per computing system basis, relative to the default delegation mechanism on the distributed ledger. The administrator component with its list of identifiers for authorized computing systems may remove the limits to the number of delegate network nodes. The constraint component with its definitions of constraints for individual computing system may provide greater flexibility and granularity in controlling operations to transfer tokens on behalf of the digital key manager of the user. The transaction component and its logic and cryptographic key can restrict performance of ledger and network operations to when the checks specified by the administrator and constraint components have been satisfied. The network operation protocol may thus improve network security with respect to the enactment of constraints on the assignment of tokens on the distributed ledger, relative to the default delegation mechanism that may be on the distributed ledger. The controller service along with the network operation protocol can thus reduce the consumption of computing resources (e.g., processor and memory) and network bandwidth. The reduction may be in comparison to techniques that would have entailed the user individually carrying out the operation using the electronic card and the other operation involving the digital key manager.

Figure 6A:
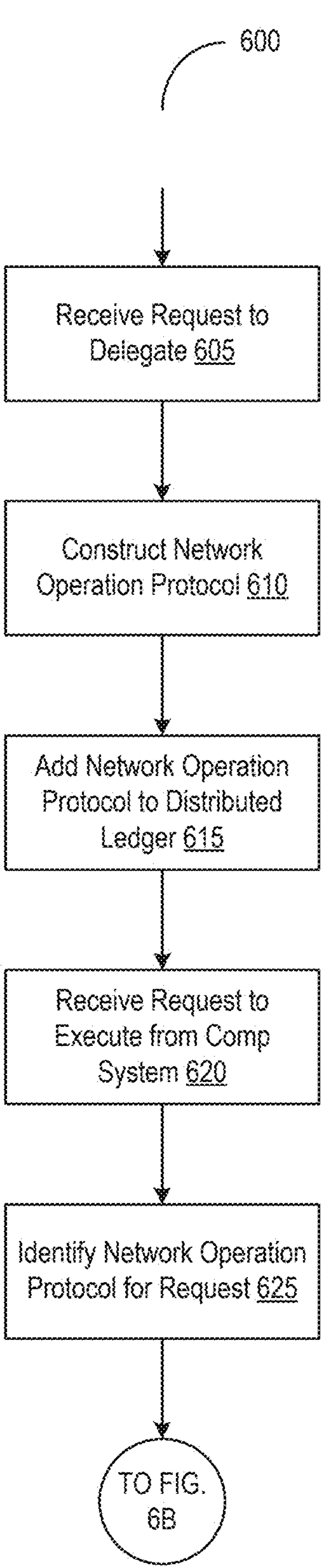
FIGS. 6A and 6B depicts flow diagrams of a method of controlling execution of operations via network operation protocols to delegate across services distributed in networked environments in accordance with an illustrative embodiment.
Figure 6B:
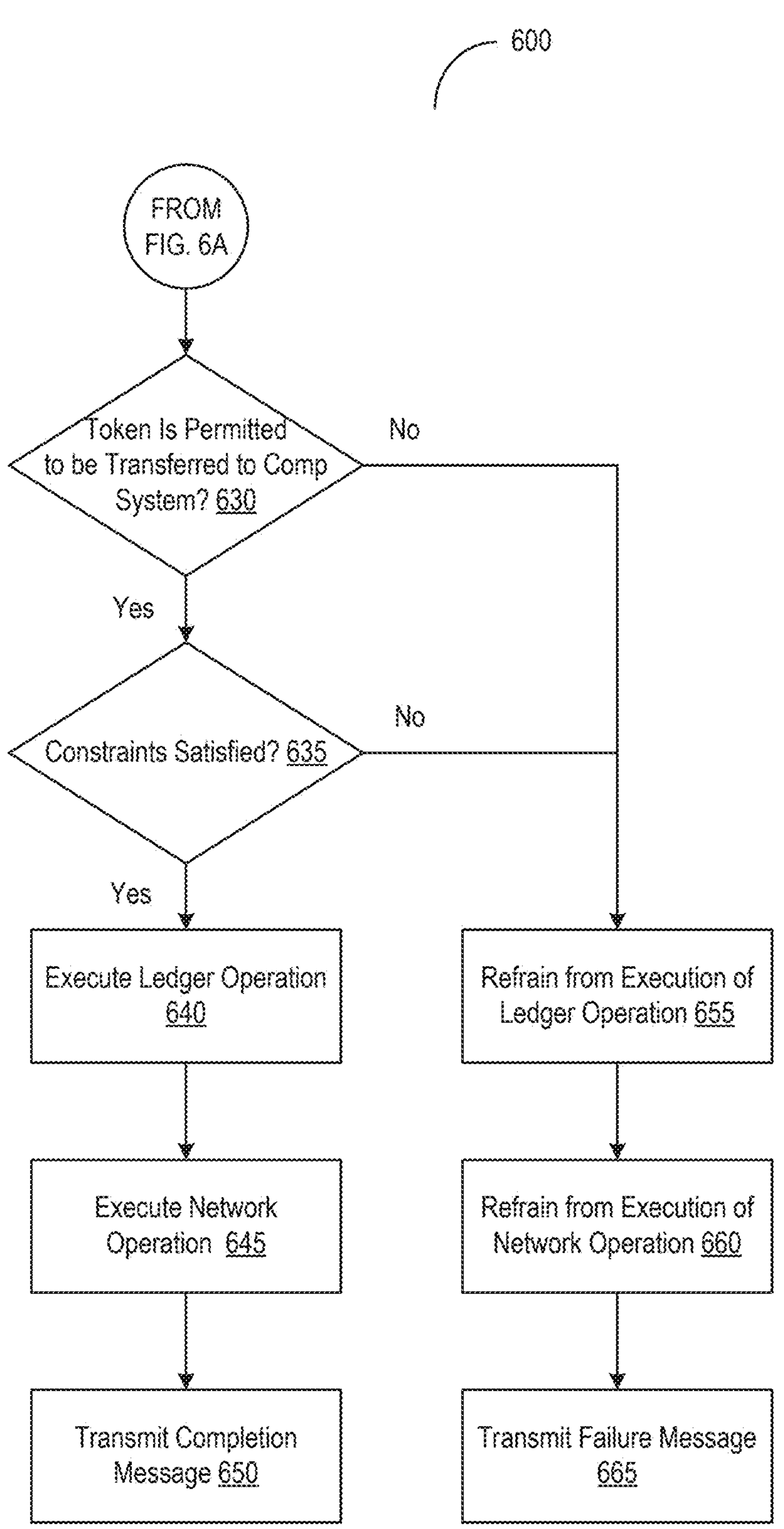

FIGS. 6A and 6B depicts flow diagrams of a method 600 of controlling executing operations via network operation protocols to delegate across services distributed in networked environments. Embodiments may include additional, fewer, or different operations from those described in the method 600. The method 600 may be performed by a server executing machine-readable software code, though it should be appreciated that the various operations may be performed by one or more computing devices and/or processors. Starting with FIG. 6A, at step 605, a controller service may receive a request to delegate from an electronic card service. The request to delegate may include a digital address for a digital key manager of a user and a card identifier of an electronic card that is linked to the digital key manager. The request to delegate may be as part of a linking of electronic card with the digital key manager by the electronic card service. The digital key manager may be assigned with one or more tokens on a distributed ledger.

At step 610, the controller service may construct a network operation protocol for controlling assignment of the tokens assigned to the digital key manager of the user. The network operation protocol may include executable code to control execution of operations on behalf of the digital key manager of the user. The network operation protocol may include: an administrative component may specify which computing systems are permitted as destinations of tokens from the digital key manager of the user; constraint component may specify a set of constraints, such as limit on the transferred value and a velocity of operations, on a per computing system basis; and a transfer component to execute transfer of tokens from the digital key manager of the user to a digital key manager of the controller service, among others. At step 615, the controller service may add the network operation protocol on the distributed ledger.

At step 620, the controller service may receive a request to execute from the electronic card service. The request may be a command to execute an operation, in response to an activation of the electronic card at a terminal of a computing system. The request to execute may include a card identifier of the electronic card, a value for the operation, and an identifier for the computing system, among others. At step 625, the controller service may identify the network operation protocol for the request. With receipt of the request, the controller service may identify the digital address for the digital key manager of the user associated with the electronic card using the card identifier. The controller service may identify the network operation protocol associated with the digital address. The controller service may execute the network operation protocol.

Moving onto FIG. 6B, at step 630, using the administrator component, the controller service may determine whether tokens of the user are permitted to be transferred to a digital key manager of the controller service on behalf of the computing system. The controller service may compare the identifier in the request to execute with the identifiers of authorized computing systems as defined in the administrator component. If the identifier in the request matches one of the authorized identifiers, the controller service may determine that the tokens are permitted to be transferred. On the other hand, if the identifier in the request does not match any of the authorized identifiers, the controller service may determine that the tokens are not permitted to be transferred.

If the tokens are determined to be permitted to be transferred, at step 635, the controller service may determine whether constraints are satisfied using the constraint component. The constraints may include: a maximum value for transfer of tokens (or the equivalent value) from the digital key manager of the user; a limit on transfers (e.g., number or rate of transfers) over a time period (e.g., ranging between 1 hour to 1 month); a remaining value (e.g., minimum number of equivalent tokens) of the digital key manager of the user; or a maximum rate of executions, among others. The constraint component may keep track of metrics for the digital key manager of the user. If the metrics are within the constraints, the controller service may determine that the constraints defined by the constraint component are satisfied. If any of the metrics are outside the constraints, the controller service may determine that the constraints defined by the constraint component are not satisfied.

If the tokens are determined to be permitted and the constraints are satisfied, at step 640, the controller service may execute a ledger operation using the transaction component. In executing the ledger operation, the controller service may transfer assignment of the tokens equivalent to the value in the request from the digital key manager of the user to the digital key manager of the controller service. At step 645, the controller service may execute a network operation. The network operation may be performed in connection with a data store service. In executing the network operation, the controller service may transfer the value from a data structure (e.g., representing an account) of the controller service to a data structure to the computing system. At step 650, the controller service may transmit a message indicating completion of the request to the computing system. On the other hand, if the tokens are not permitted to be transferred or the constraints are not satisfied, at step 655, the controller service may refrain from execution of the ledger operation. The tokens may remain at the digital key manager of the user. At step 660, the controller service may refrain from execution of the network operation. The value may remain at the data structure associated with the controller service. At step 665, the controller service may transmit a message indicating failure to carry out the request.

Figure 7:
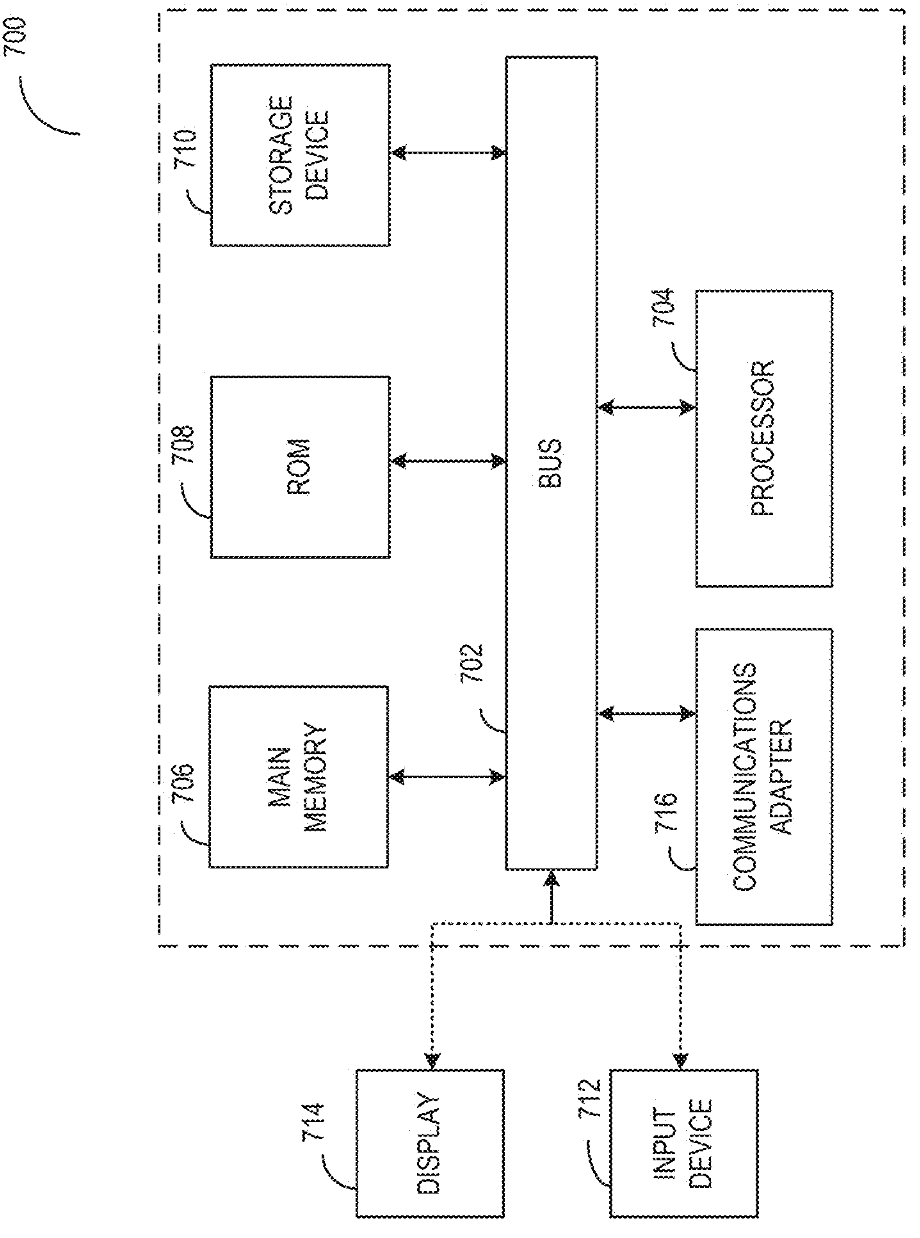
FIG. 7 illustrates a component diagram of an example computing system suitable for use in the various implementations described herein, in accordance with an illustrative embodiment.

FIG. 7 is a component diagram of an example computing system suitable for use in the various implementations described herein, according to an example implementation. One or more steps of the methods and processes discussed herein can be performed by the computing system depicted in FIG. 7. The computing system 700 includes a bus 702 or other communication component for communicating information and a processor 704 coupled to the bus 702 for processing information. The computing system 700 also includes main memory 706, such as a RAM or other dynamic storage device, coupled to the bus 702 for storing information, and instructions to be executed by the processor 704. Main memory 706 can also be used for storing position information, temporary variables, or other intermediate information during the execution of instructions by the processor 704. The computing system 700 may further include a ROM 708 or other static storage device coupled to the bus 702 for storing static information and instructions for the processor 704. A storage device 710, such as a solid-state device, magnetic disk, or optical disk, is coupled to the bus 702 for persistently storing information and instructions.

The computing system 700 may be coupled via the bus 702 to a display 714, such as a liquid crystal display, or active-matrix display, for displaying information to a user. An input device 712, such as a keyboard including alphanumeric and other keys, may be coupled to the bus 702 for communicating information, and command selections to the processor 704. In another implementation, the input device 712 has a touchscreen display. The input device 712 can include any type of biometric sensor, or a cursor control, such as a mouse, a trackball, or cursor direction keys, for communicating direction information and command selections to the processor 704 and for controlling cursor movement on the display 714.

In some implementations, the computing system 700 may include a communications adapter 716, such as a networking adapter. Communications adapter 716 may be coupled to bus 702 and may be configured to enable communications with a computing or communications network or other computing systems. In various illustrative implementations, any type of networking configuration may be achieved using communications adapter 716, such as wired (e.g., via Ethernet), wireless (e.g., via Wi-Fi, Bluetooth), satellite (e.g., via GPS) pre-configured, ad-hoc, LAN, WAN, and the like.

According to various implementations, the processes of the illustrative implementations that are described herein can be achieved by the computing system 700 in response to the processor 704 executing an implementation of instructions contained in main memory 706. Such instructions can be read into main memory 706 from another computer-readable medium, such as the storage device 710. Execution of the implementation of instructions contained in main memory 706 causes the computing system 700 to perform the illustrative processes described herein. One or more processors in a multi-processing implementation may also be employed to execute the instructions contained in the main memory 706. In alternative implementations, hard-wired circuitry may be used in place of or in combination with software instructions to implement illustrative implementations. Thus, implementations are not limited to any specific combination of hardware circuitry and software.

The foregoing method descriptions and the process flow diagrams are provided merely as illustrative examples and are not intended to require or imply that the steps of the various embodiments must be performed in the order presented. The steps in the foregoing embodiments may be performed in any order. Words such as "then," "next," etc. are not intended to limit the order of the steps; these words are simply used to guide the reader through the description of the methods. Although process flow diagrams may describe the operations as a sequential process, many of the operations can be performed in parallel or concurrently. In addition, the order of the operations may be re-arranged. A process may correspond to a method, a function, a procedure, a subroutine, a subprogram, and the like. When a process corresponds to a function, the process termination may correspond to a return of the function to a calling function or a main function.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of this disclosure or the claims.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc., may be passed, forwarded, or transmitted via any suitable means, including memory sharing, message passing, token passing, network transmission, etc.

The actual software code or specialized control hardware used to implement these systems and methods is not limiting of the claimed features or this disclosure. Thus, the operation and behavior of the systems and methods were described without reference to the specific software code being understood that software and control hardware can be designed to implement the systems and methods based on the description herein.

When implemented in software, the functions may be stored as one or more instructions or code on a non-transitory computer-readable or processor-readable storage medium. The steps of a method or algorithm disclosed herein may be embodied in a processor-executable software module, which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used herein, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the embodiments described herein and variations thereof. Various modifications to these embodiments will be readily apparent to those skilled in the art, and the generic principles defined herein may be applied to other embodiments without departing from the spirit or scope of the subject matter disclosed herein. Thus, the present disclosure is not intended to be limited to the embodiments shown herein but is to be accorded the widest scope consistent with the following claims and the principles and novel features disclosed herein.

While various aspects and embodiments have been disclosed, other aspects and embodiments are contemplated. The various aspects and embodiments disclosed are for purposes of illustration and are not intended to be limiting, with the true scope and spirit being indicated by the following claims.

The invention claimed is:

1. A method of controlling execution of operations via network operation protocols to delegate across services distributed in networked environments, comprising:

receiving, by a first service from a second service, a request to delegate comprising a digital address of a first digital key manager of a user to which at least one token of a plurality of tokens on a distributed ledger is assigned, the first digital key manager associated with an electronic card generated by the second service for the user;

constructing, by the first service responsive to the request to delegate, a network operation protocol comprising:

(i) a first component configured to control transfer of an assignment of the at least one token from the first digital key manager to a second digital key manager of the first service on behalf of at least one of a plurality of computing systems, (ii) a second component configured to set, for each of the plurality of computing systems, a respective plurality of constraints on execution of ledger operations on the distributed ledger for transferring the assignment of the at least one token to the second digital key manager, and (iii) a third component configured to execute the ledger operations to transfer the assignment of the at least one token;

adding, by the first service, on the distributed ledger, the network operation protocol for the at least one token assigned to the first digital key manager;

receiving, by the first service in response to activation of the electronic card using a terminal of a computing system of the plurality of computing systems, a request to execute comprising a value to be transferred from a first data structure of the user to a second data structure of the computing system;

identifying, by the first service, from the distributed ledger, the network operation protocol of the at least one token associated with the user, responsive to receiving the request to execute;

determining, by the first service, using the first component, that the assignment of the at least one token is permitted to be transferred from the first digital key manager to the second digital key manager on behalf of the computing system;

determining, by the first service, using the second component, that a plurality of constraints for the computing system is satisfied based on the request to execute; and executing, by the first service, using the third component, a ledger operation to transfer the assignment of the at least one token from the first digital key manager to the second digital key manager, responsive to determining that the assignment is permitted and determining that the plurality of constraints is satisfied.

2. The method of claim 1, further comprising, responsive to a second request to execute from a second computing system:

determining, by the first service, using the first component, that the assignment of the at least one token is not permitted to be transferred from the first digital key manager to the second digital key manager on behalf of the second computing system;

determining, by the first service, using the second component, that the plurality of constraints is not satisfied based on the second request to execute; and responsive to determining that the assignment is not permitted or determining that the plurality of constraints is not satisfied:

refraining, by the first service, using the third component, from executing a second ledger operation to transfer assignment of the at least one token from the first digital key manager to the second digital key manager; and transmitting, by the first service to the second computing system, a message to indicate failure to validate against the network operation protocol.

3. The method of claim 1, further comprising determining, by the first service, responsive to receiving the request to execute, that a plurality of execution controls for the ledger operations and network operations is satisfied, the plurality of execution controls separate from the plurality of constraints of the network operation protocol, wherein executing the ledger operation further comprises executing the ledger operation, responsive to determining that the plurality of execution controls is satisfied.

4. The method of claim 1, wherein receiving the request to execute further comprises receiving an identifier of the electronic card associated with the first digital key manager of the user, and further comprising:

identifying, by the first service, using the identifier of the electronic card, the digital address of the first digital key manager, wherein identifying the network operation protocol further comprises identifying, using the digital address of the first digital key manager, the network operation protocol on the distributed ledger.

5. The method of claim 1, further comprising:

receiving, by the first service from the second service, a request to terminate delegation of the at least one token that is assigned to the first digital key manager to the second digital key manager; and disabling, by the first service, responsive to receiving the request to terminate, the network operation protocol on the distributed ledger to revoke permission to transfer the at least one token from the first digital key manager to the second digital key manager.

6. The method of claim 1, wherein constructing the network operation protocol further comprises constructing the network operation protocol to include a plurality of identifiers corresponding to the plurality of computing systems for which the at least one token is permitted to be transferred from the first digital key manager to the second digital key manager, wherein determining that the assignment of the at least one token is permitted to be transferred further comprises: (i) identifying an identifier corresponding to the computing system from the request to execute and (ii) determining that the identifier corresponding to the computing system matches one of the plurality of identifiers.

7. The method of claim 1, wherein determining that the plurality of constraints is satisfied further comprises identifying, using the second component, the plurality of constraints for the computing system using an identifier corresponding to the computing system from the request to execute.

8. The method of claim 1, wherein executing the ledger operation further comprises executing transferring the assignment of the at least one token from the first digital key manager of the user via a third digital key manager of the network operation protocol to the second digital key manager of the first service.

9. The method of claim 1, wherein the plurality of constraints comprise at least one of: (i) a maximum value for transfer, (ii) a limit on transfers over a time period, (iii) a remaining value of the first digital key manager, or (iv) a maximum rate of executions.

10. The method of claim 1, further comprising:

executing, by the first service, a network operation to transfer the value from the first data structure of the user to the second data structure of the computing system, responsive to determining that the assignment is permitted;

determining that the plurality of constraints is satisfied, and executing the ledger operation; and transmitting, by the first service to the computing system, a message to indicate completion of the request to execute, responsive to executing the ledger operation and the network operation.

11. A system for controlling execution of operations via network operation protocols to delegate across services distributed in networked environments, comprising:

a first service having one or more processors coupled with memory, configured to:

receive, from a second service, a request to delegate comprising a digital address of a first digital key manager of a user to which at least one token of a plurality of tokens on a distributed ledger is assigned, the first digital key manager associated with an electronic card generated by the second service for the user;

construct, responsive to the request to delegate, a network operation protocol comprising:

(i) a first component configured to control transfer of an assignment of the at least one token from the first digital key manager to a second digital key manager of the first service on behalf of at least one of a plurality of computing systems, (ii) a second component configured to set, for each of the plurality of computing systems, a respective plurality of constraints on execution of ledger operations on the distributed ledger for transferring the assignment of the at least one token to the second digital key manager, and (iii) a third component configured to execute the ledger operations to transfer the assignment of the at least one token;

add, on the distributed ledger, the network operation protocol for the at least one token assigned to the first digital key manager;

receive, in response to activation of the electronic card using a terminal of a computing system of the plurality of computing systems, a request to execute comprising a value to be transferred from a first data structure of the user to a second data structure of the computing system;

identify, from the distributed ledger, the network operation protocol of the at least one token associated with the user, responsive to receiving the request to execute;

determine, using the first component, that the assignment of the at least one token is permitted to be transferred from the first digital key manager to the second digital key manager on behalf of the computing system;

determine, using the second component, that a plurality of constraints for the computing system is satisfied based on the request to execute; and execute, using the third component, a ledger operation to transfer the assignment of the at least one token from the first digital key manager to the second digital key manager, responsive to determining that the assignment is permitted and determining that the plurality of constraints is satisfied.

12. The system of claim 11, wherein the first service is further configured to, responsive to a second request to execute from a second computing system:

determine, using the first component, that the assignment of the at least one token is not permitted to be transferred from the first digital key manager to the second digital key manager on behalf of the second computing system;

determine, using the second component, that the plurality of constraints is not satisfied based on the second request to execute; and responsive to determining that the assignment is not permitted or determining that the plurality of constraints is not satisfied:

refrain, using the third component, from executing a second ledger operation to transfer assignment of the at least one token from the first digital key manager to the second digital key manager; and transmit, to the second computing system, a message to indicate failure to validate against the network operation protocol.

13. The system of claim 11, wherein the first service is further configured to:

determine, responsive to receiving the request to execute, that a plurality of execution controls for the ledger operations and network operations is satisfied, the plurality of execution controls separate from the plurality of constraints of the network operation protocol; and execute the ledger operation, responsive to determining that the plurality of execution controls is satisfied.

14. The system of claim 11, wherein the first service is further configured to:

receive the request to execute comprising an identifier of the electronic card associated with the first digital key manager of the user;

identify, using the identifier of the electronic card, the digital address of the first digital key manager; and identify, using the digital address of the first digital key manager, the network operation protocol on the distributed ledger.

15. The system of claim 11, wherein the first service is further configured to:

receive, from the second service, a request to terminate delegation of the at least one token that is assigned to the first digital key manager to the second digital key manager; and disable, responsive to receiving the request to terminate, the network operation protocol on the distributed ledger to revoke permission to transfer the at least one token from the first digital key manager to the second digital key manager.

16. The system of claim 11, wherein the first service is further configured to:

construct the network operation protocol to include a plurality of identifiers corresponding to the plurality of computing systems for which the at least one token is permitted to be transferred from the first digital key manager to the second digital key manager; and determine that the assignment of the at least one token is permitted to be transferred by (i) identifying an identifier corresponding to the computing system from the request to execute and (ii) determining that the identifier corresponding to the computing system matches one of the plurality of identifiers.

17. The system of claim 11, wherein the first service is further configured to:

execute a network operation to transfer the value from the first data structure of the user to the second data structure of the computing system, responsive to determining that the assignment is permitted, determining that the plurality of constraints is satisfied, and executing the ledger operation; and transmit, to the computing system, a message to indicate completion of the request to execute, responsive to executing the ledger operation and the network operation.

18. A non-transitory computer readable medium storing instructions, which when executed by at least one processor, cause the at least one processor on a first service to:

receive, from a second service, a request to delegate comprising a digital address of a first digital key manager of a user to which at least one token of a plurality of tokens on a distributed ledger is assigned, the first digital key manager associated with an electronic card generated by the second service for the user;

construct, responsive to the request to delegate, a network operation protocol comprising:

(i) a first component configured to control transfer of an assignment of the at least one token from the first digital key manager to a second digital key manager of the first service on behalf of at least one of a plurality of computing systems, (ii) a second component configured to set, for each of the plurality of computing systems, a respective plurality of constraints on execution of ledger operations on the distributed ledger for transferring the assignment of the at least one token to the second digital key manager, and (iii) a third component configured to execute the ledger operations to transfer the assignment of the at least one token;

add, on the distributed ledger, the network operation protocol for the at least one token assigned to the first digital key manager;

receive, in response to activation of the electronic card using a terminal of a computing system of the plurality of computing systems, a request to execute comprising a value to be transferred from a first data structure of the user to a second data structure of the computing system;

identify, from the distributed ledger, the network operation protocol of the at least one token associated with the user, responsive to receiving the request to execute;

determine, using the first component, that the assignment of the at least one token is permitted to be transferred from the first digital key manager to the second digital key manager on behalf of the computing system;

determine, using the second component, that a plurality of constraints for the computing system is satisfied based on the request to execute; and execute, using the third component, a ledger operation to transfer the assignment of the at least one token from the first digital key manager to the second digital key manager, responsive to determining that the assignment is permitted and determining that the plurality of constraints is satisfied.

19. The non-transitory computer readable medium of claim 18, wherein the instructions, which when executed by at least one processor, further cause the at least one processor to, responsive to a second request to execute from a second computing system:

determine, using the first component, that the assignment of the at least one token is not permitted to be transferred from the first digital key manager to the second digital key manager on behalf of the second computing system;

determine, using the second component, that the plurality of constraints is not satisfied based on the second request to execute; and responsive to determining that the assignment is not permitted or determining that the plurality of constraints is not satisfied:

refrain, using the third component, from executing a second ledger operation to transfer assignment of the at least one token from the first digital key manager to the second digital key manager; and transmit, to the second computing system, a message to indicate failure to validate against the network operation protocol.

20. The non-transitory computer readable medium of claim 18, wherein the instructions, which when executed by at least one processor, further cause the at least one processor to:

receive the request to execute comprising an identifier of the electronic card associated with the first digital key manager of the user;

identify, using the identifier of the electronic card, the digital address of the first digital key manager; and identify, using the digital address of the first digital key manager, the network operation protocol on the distributed ledger.

* * * * *